(12) United States Patent
Kornilovsky et al.

(10) Patent No.: US 8,311,530 B2
(45) Date of Patent: Nov. 13, 2012

(54) TOUCH ENTRY OF PASSWORD ON A MOBILE DEVICE

(75) Inventors: Alexander Kornilovsky, Waterloo (CA); Alexei Skarine, Waterloo (CA)

(73) Assignee: Research In Motion Limited, Waterloo (CA)

(*) Notice: Subject to any disclaimer, the term of this patent is extended or adjusted under 35 U.S.C. 154(b) by 1277 days.

(21) Appl. No.: 11/627,400

(22) Filed: Jan. 26, 2007

(65) Prior Publication Data
US 2008/0184360 A1    Jul. 31, 2008

(51) Int. Cl.
H04M 3/00    (2006.01)

(52) U.S. Cl. ............. 455/418; 455/575.1; 455/575.8; 726/17; 726/19; 345/173; 713/182

(58) Field of Classification Search .......... 455/418, 455/575.1, 575.8; 726/17, 19; 345/173; 713/182
See application file for complete search history.

(56) References Cited

U.S. PATENT DOCUMENTS

| | | | |
|---|---|---|---|
| 5,825,353 A | 10/1998 | Will | |
| 2002/0019947 A1 | 2/2002 | Umezawa et al. | |
| 2002/0104005 A1 | 8/2002 | Yin et al. | |
| 2003/0097596 A1 | 5/2003 | Muratov et al. | |
| 2003/0132974 A1 | 7/2003 | Bodin | |
| 2004/0085351 A1 | 5/2004 | Tokkonen | |
| 2005/0144484 A1* | 6/2005 | Wakayama | 713/202 |
| 2005/0162407 A1 | 7/2005 | Sakurai et al. | |
| 2006/0007129 A1 | 1/2006 | Pletikosa | |
| 2006/0050168 A1* | 3/2006 | Okada et al. | 348/333.06 |
| 2006/0140428 A1 | 6/2006 | Qi et al. | |
| 2006/0181521 A1* | 8/2006 | Perreault et al. | 345/173 |

FOREIGN PATENT DOCUMENTS

| | | |
|---|---|---|
| EP | 0685953 A1 | 12/1995 |
| EP | 0899647 A | 3/1999 |
| FR | 2864855 A1 | 7/2005 |
| WO | WO 03048909 | 6/2003 |
| WO | WO 2007048687 | 5/2007 |

OTHER PUBLICATIONS

"Castlevania: Symphony of the Night PXS Cheats and hints", Gamers Gateway, web pages 1-12, printed Feb. 21, 2006.
"Street Fighter Alpha 2", GameWinners.com, web pages 1-4, printed Feb. 21, 2006.
"Cheats for Super Mario Brothers 3 on NES", dotCheats.com, web pages 1-3, printed Feb. 21, 2006.
"Xbox Addict Asylum", tom clancy games, web pages 1 and 2, printed Feb. 21, 2006.
European Search Report for European application No. 07101245.4; Oct. 15, 2007; 8 pages.

* cited by examiner

Primary Examiner — Amancio Gonzalez
(74) Attorney, Agent, or Firm — Ridout & Maybee LLP

(57) ABSTRACT

An electronic mobile device that includes a controller including at least one processor, for controlling operation of the mobile device, a display coupled to the controller, and a navigational input mechanism coupled to the controller and responsive to user manipulation thereof. The controller, in one input mode, moves a selection marker on a user interface screen on the display in response to user manipulation of the navigational input mechanism, and in a second input mode, authenticates a user of the device in dependence on a sequence of input events resulting from user manipulation of the navigational input mechanism matching a predetermined passcode sequence.

20 Claims, 6 Drawing Sheets

TOUCH ENTRY OF PASSWORD ON A MOBILE DEVICE

FIELD

The present application relates to password entry on a mobile device.

BACKGROUND

It is common for mobile devices to include a password protection mechanism for user authentication in order to prevent unauthorized access to data stored on or accessible through the mobile device. The password commonly includes a predetermined sequence of alphanumeric or numeric characters, requiring the mobile device user to look at the mobile device to ensure that the right keys are pressed in the correct sequence to ensure successful entry of the password. If the password is incorrectly entered, the user will need to enter the password again, perhaps to the annoyance of the device user.

Accordingly, it would be advantageous to improve methods and systems for user authentication.

BRIEF DESCRIPTION OF THE DRAWINGS

Reference will now be made, by way of example, to the accompanying drawings which show example embodiments, and in which.

Similar reference numerals may have been used in different figures to denote similar components.

DESCRIPTION OF EXAMPLE EMBODIMENTS

According to one example embodiment there is provided an electronic mobile device, comprising: a controller; a display coupled to the controller; and a touch pad coupled to the controller; the controller, in one input mode, moving a selection marker on a user interface screen on the display in response to input from the touch pad, and in a second input mode, performing authentication using a sequence of input events from the touch pad matching a predetermined passcode sequence corresponding to one or more directions of successive inputs detected by the touch pad.

According to another example embodiment, there is provided a method of authentication of an electronic mobile device having a touch pad that can receive input to facilitate on-screen navigation for the electronic mobile device, the method comprising: receiving a sequence of inputs through the touch pad, the sequence comprising one or more directions of successive inputs; interpreting each distinct directional input detected at the touch pad as either an input event corresponding to the first direction or the second direction; comparing the received sequence of inputs to a predetermined passcode sequence, wherein the predetermined passcode sequence corresponds to a predetermined sequence of the input events corresponding to the first direction or second direction; and authenticating if the received sequence of inputs matches the predetermined passcode sequence.

According to a further example embodiment, there is provided a computer program product comprising a computer readable medium having stored thereon computer executable instructions for authentication of an electronic mobile device having a touch pad that can receive input to facilitate on-screen navigation for the electronic mobile device, the computer executable instructions comprising: receiving a sequence of inputs through the touch pad, the sequence comprising one or more directions of successive inputs; interpreting each distinct directional input detected at the touch pad as either an input event corresponding to the first direction or the second direction; comparing the received sequence of inputs to a predetermined passcode sequence, wherein the predetermined passcode sequence corresponds to a predetermined sequence of the input events corresponding to the first direction or second direction; and authenticating if the received sequence of inputs matches the predetermined passcode sequence.

The present description of example embodiments does not limit implementation to any particular computer programming language or system architecture. Embodiments described in the specification are not limited to any particular operating system (OS), mobile device architecture, server architecture, or computer programming language.

Figure 1:
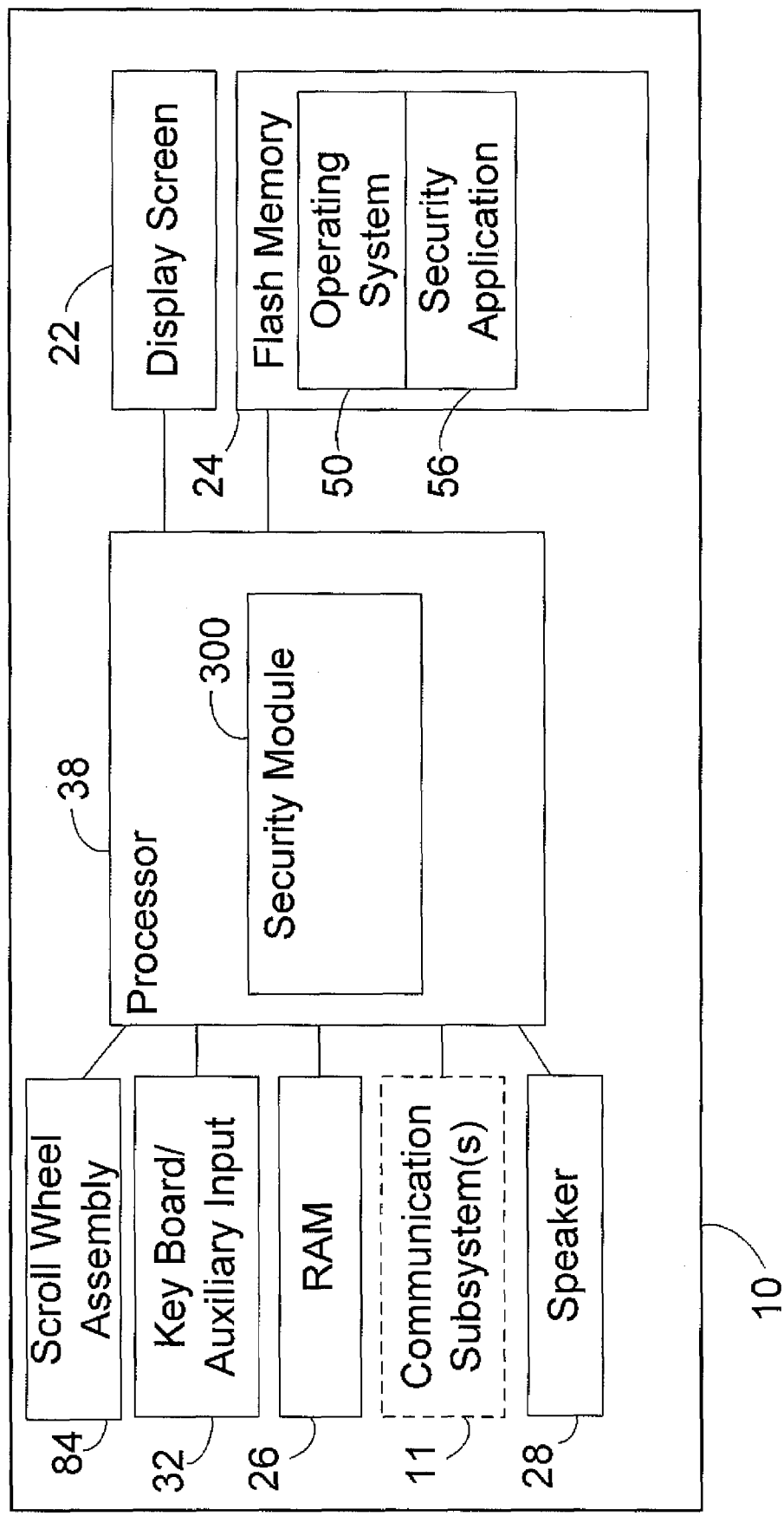
FIG. 1 shows a block diagram of an electronic mobile device to which example embodiments can be applied.

Referring now to the drawings, FIG. 1 is a block diagram of an electronic mobile device 10 to which example embodiments can be applied. The mobile device 10 includes a controller (for example microprocessor 38) that controls the overall operation of the device. The microprocessor 38 is coupled to and interacts with device subsystems such as a display 22, flash memory 24, random access memory (RAM) 26, speaker 28, communication subsystem(s) 11 (including for example a wireless transceiver) and user input components 32 such as a keyboard or keypad and auxiliary on-screen navigation and selection input device(s) such as a touch screen, touch pad, directional button(s), joystick and/or scroll wheel assembly 84.

Some examples of the mobile device 10 include the wireless communications subsystem(s) 11 for exchanging communications with one or more communications networks including, for example, cellular type wide area wireless networks and/or wireless local area networks. In some examples, the mobile device 10 is a two-way, electronic communications device having data and possibly also voice communication capabilities. In some examples, the mobile device 10 has the capability to exchange messages with other devices and computer systems on the Internet. Depending on the functionality provided by the mobile device 10, in various examples the mobile device may be a multiple-mode communication device configured for both data and voice communications, a smartphone, a Personal Digital Assistant (PDA), and a mobile computer system among other things. In some examples, the mobile device 10 is not a wireless communications device. For example, there exist PDAs that are not capable of sending and receiving wireless communications.

Operating system software 50 and various software applications (for example, security application 56) used by the microprocessor 38 are, in a number of example embodiments, stored in a persistent store such as the flash memory 24 or similar storage element. Those skilled in the art will appreciate that the operating system 50, other software applications, or parts thereof, may be temporarily loaded into a volatile store such as the RAM 26.

The microprocessor 38, in addition to its operating system functions, can enable execution of software applications (for example, the security application 56) on the mobile device 10. A predetermined set of software applications which control basic device operations, including data and voice communication applications for example, will normally be installed on the mobile device 10. In some embodiments, the processor 38 is configured to implement a number of software modules for interacting with the various device subsystems described above (or other device subsystems). For example, under instructions from the security application 56 resident on the mobile device 10, the processor 38 could be configured to implement security module 300. The security module 300 will carry out security related functions and tasks, including those described below, while other modules implemented on the mobile device will carry out other functions and tasks (for example, related to scheduling, communications, document processing, etc.). In various embodiments, part or all of security application 56 could be integrated into operating system 50 and/or other software applications.

Functions and tasks that might be carried out by the security module 300 include one or more of the following: setting, resetting, verifying and storing passwords, locking the mobile device 10, locking the user input components 32, protecting or reducing the size of content stored on the mobile device 10, facilitating regeneration of encryption keys, verifying security software, preventing third-party applications from transmitting data, and facilitating the deletion of data from the mobile device 10 for security reasons. In addition, those skilled in the art will appreciate that some examples of the security module 300 will carry out additional security related functions and tasks besides those listed above.

Figure 2:
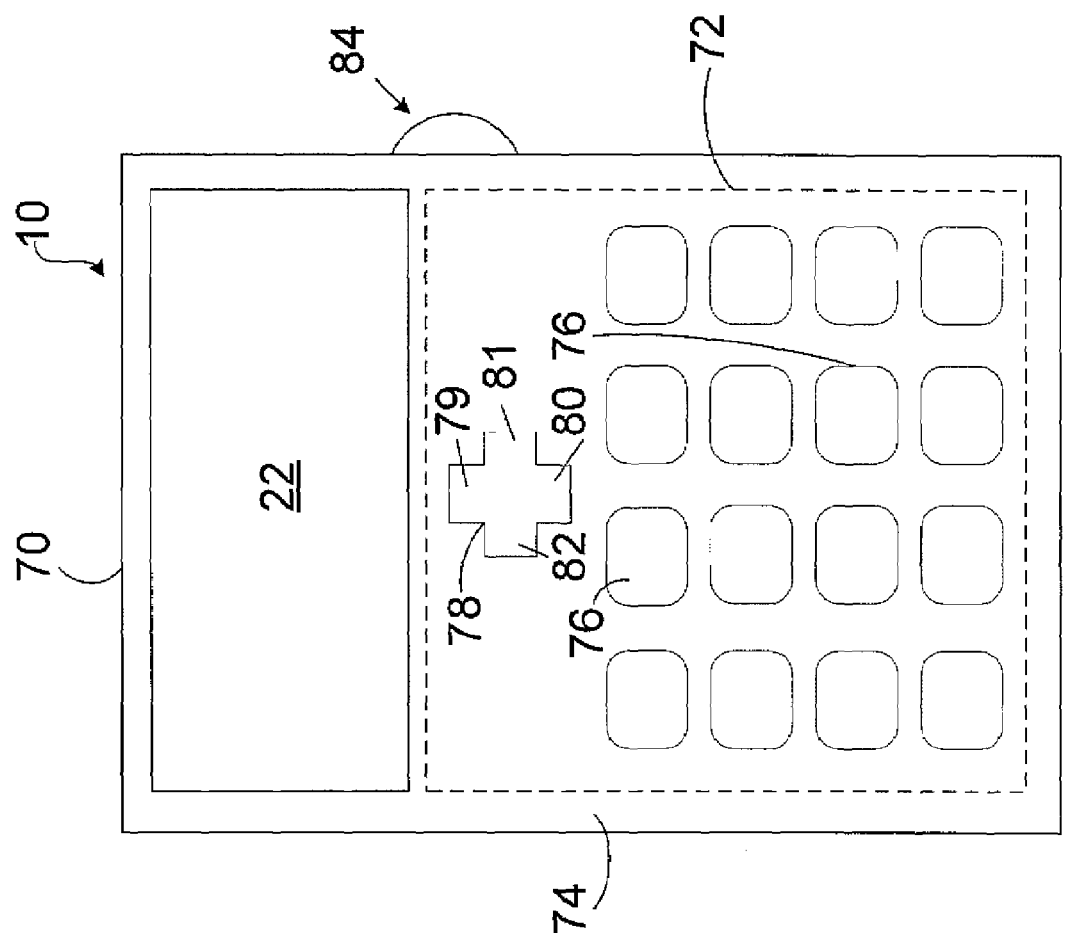
FIG. 2 is a front or plan view, in diagrammatic form, of an example mobile device.

With reference now to FIG. 2, in some examples, the components and subsystems of mobile device 10 are housed within a rigid case 70 that is configured to be held with one or two hands while the mobile device 10 is in use. The mobile device 10 is, in some examples, a hand held device small enough to fit inside a standard purse or coat pocket or belt mounted holster. In the illustrated embodiment, keypad 72 is horizontally positioned symmetrically between a left edge and a right edge of a face 74 of the mobile device 10. The keypad 72 includes several, similarly sized input buttons or keys 76 for user input of displayable numbers, letters or other characters. In some examples, the keys 76 of the keypad 72 consist of number, pound and asterisk keys typically found on any telephone, plus a few additional keys associated with miscellaneous inputs (for example, a hang up or answer call key). In other examples, the keypad 72 will have a larger number of keys than illustrated. For instance, the keypad 72 could mimic standard keyboards normally associated with personal computers (e.g. a number of the keys 76 could each permit input of a particular letter of the alphabet).

In the illustrated example embodiment, the mobile device 10 includes as a navigational input mechanism a scroll wheel assembly 84. The scroll wheel assembly 84 in at least one operational mode facilitates on-screen navigation by moving a cursor or similar selection indicia or position marker within a user interface generated on the display 22.

Figure 3:
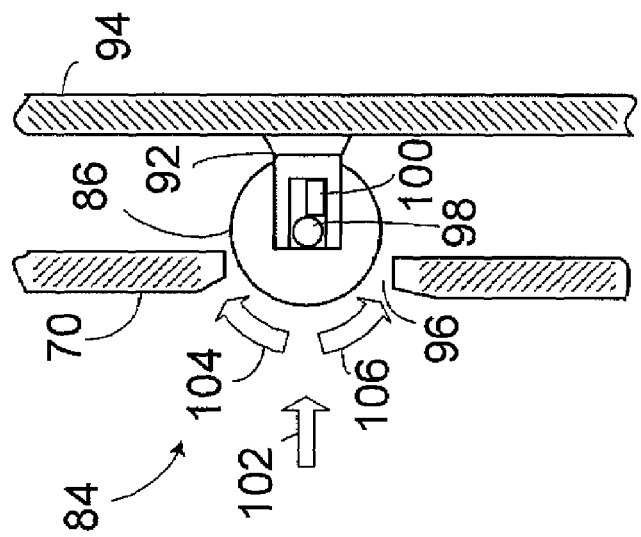
FIG. 3 is a partial sectional view of the device of FIG. 2, in particular, a scroll wheel assembly of that device is shown.

Referring to FIG. 3, the assembly 84 includes a rotatable scroll wheel 86 that can be rotated upwards towards an upper end of the device or downwards towards a bottom end of the device, as indicated by the arrows 104 and 106 respectively. The scroll wheel 86 is mounted by a scroll switch assembly 92 to a printed circuit board 94 to rotate about an axis perpendicular to the face 74 of the mobile device 10. The circuit board 94 is mounted within the housing case 70 and a portion of the scroll wheel 86 protrudes through an elongate rectangular opening 96 that is provided through a side of the housing case 70 for manipulation by a thumb (or other hand digit) of a user of the mobile device 10. The scroll switch assembly 92 supports both ends of the scroll wheel 86 and includes a rotating encoder switch 98 for detecting switch inputs when the scroll wheel 86 is rotated. The rotating encoder switch 98 can take various forms—by way of non-limiting examples, it may include mechanical, optical and/or magnetic sensors for detecting rotation (including the amount of rotation and direction of rotation) of the scroll wheel 86. Tactile feedback can, in example embodiments, be provided to the user upon predetermined degrees of rotation of the scroll wheel.

The scroll wheel switch assembly 92 includes a tactile contact switch 100 for detecting depression of the scroll wheel 86 and providing click-like tactile feedback to the user when the scroll wheel 86 is depressed. In some examples, the rotating encoder switch 98 also provides tactile feedback to the user by providing increased rotational resistance whenever a new switch point is hit during rotation of the scroll wheel 86. In various examples, other types of movement detectors such as optical or magnetic based sensors, for instance, can be used in place of tactile contact switch 100 for sensing depression of the scroll wheel 86.

Having discussed example hardware components of the mobile device 10, a number of example user interface screens of the mobile device 10 are now described in order that details of example embodiments may be expounded upon. According to example embodiments, instead of being limited to using a traditional password consisting of a predetermined sequence of characters entered through alphanumeric keys 76, the user is able provide user authentication to unlock functions of the mobile device 10 through a specified sequence of predetermine inputs made through a navigational input mechanism, including for example a scroll wheel 86.

The security module 300 will typically be configured to place the device 10 into a locked standby mode upon the occurrence of one or more predetermined conditions, including for example (but not limited to) user selection of a lockout option, expiry of a time out period from the last time a user input was received, expiry of a time out period since last radio contact through communications subsystem 11, and/or holstering of the mobile device 10. When the mobile device 10 is in a locked standby mode, a user is prevented from using all or substantially all of device functionality without first entering a shared secret to unlock the device. In an example embodiment, when the device 10 is in a locked state, user access is limited to a password entry user interface or to making emergency calls to a dedicated emergency number such as "911"—other than emergency calls, the user is unable to initiate wireless communications (for example phone calls, email or text messaging) from the device 10, and user access to any device applications and data stored on the device 10 is not permitted.

Figure 4:
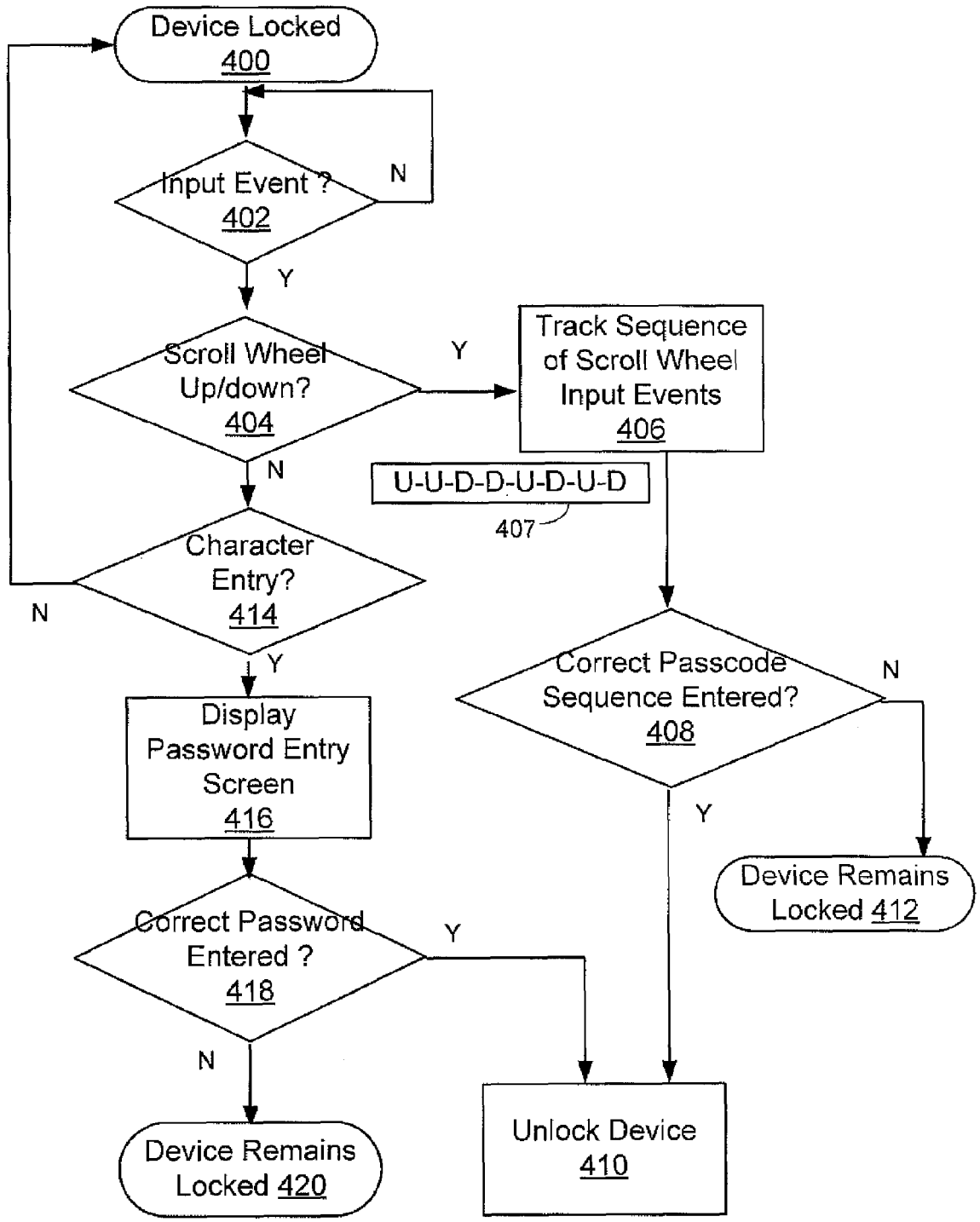
FIG. 4 shows a flowchart illustrating an example shared secret or password entry process for unlocking mobile device

FIG. 4 shows a flowchart illustrating an example user authentication process that includes a shared secret or password/passcode sequence entry process enabled by security module 300 for unlocking mobile device 10. In the process of FIG. 4, the device user can unlock the device either by entering an alphanumeric password (i.e. a password made up of a sequence of characters) through keyboard 72, or through entering a passcode sequence by manipulating the scroll wheel 86 in a predetermined sequence. The process begins with the mobile device 10 in a locked state (block 400). While in the locked state, the mobile device 10 monitors for an input event (block 402) through the device user input interfaces (including for example keyboard 72 or scroll wheel 86). If an input event occurs, a determination is made as to whether the input event includes scrolling of the scroll wheel 86 in the up or down directions (block 404). If the input includes scrolling of the scroll wheel 86, the security module 300 then tracks the scroll sequence (block 406) applied to the scroll wheel 86 until the scroll wheel is depressed (or other predetermined entry input made) after which the security module 300 determines if the sequence of scroll wheel inputs matches a predetermined "passcode" sequence (block 408). If a match exists, the device is unlocked (block 410), otherwise the device remains locked (block 412).

Figure 5:
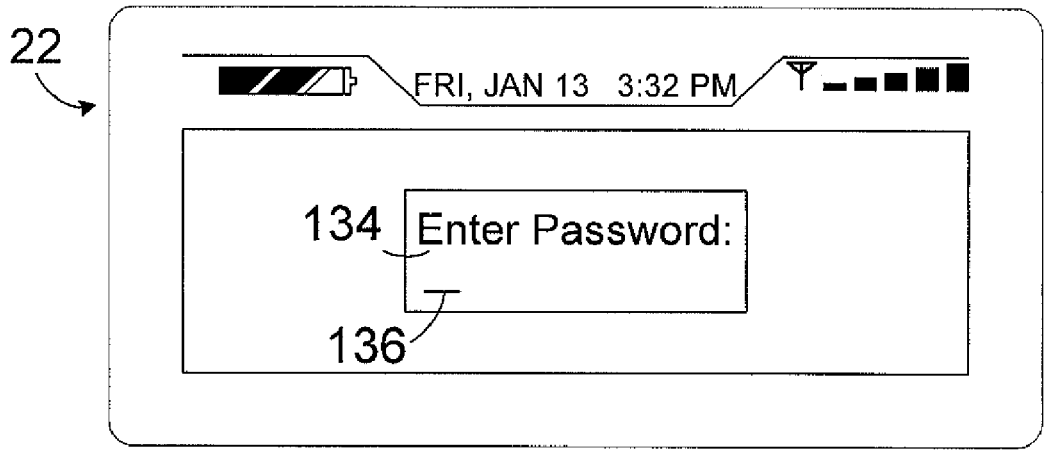
FIG. 5 shows, in diagrammatic form, a first user interface screen within which a user of the device shown in FIG. 2 is prompted to enter a password.
Figure 6:
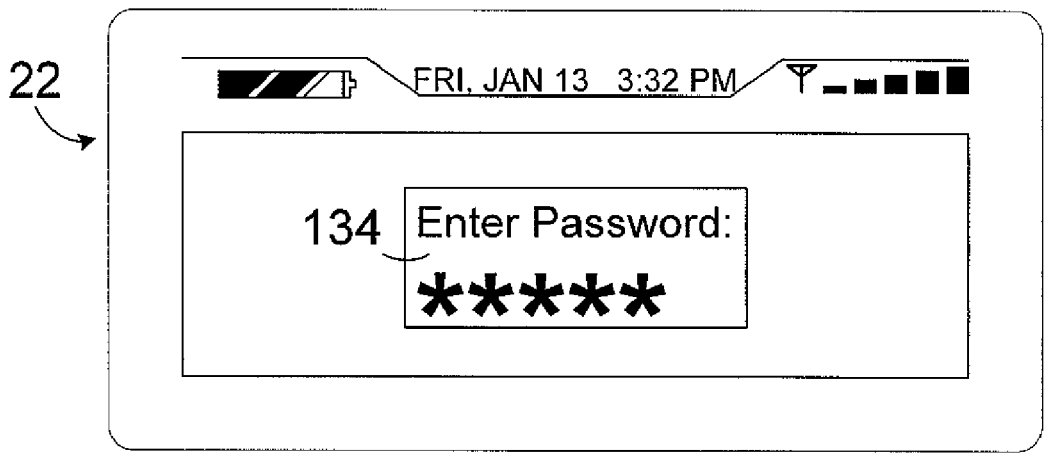
FIG. 6 shows, in diagrammatic form, a similar screen to the one shown in FIG. 5, but at a point in time after the user has inputted a password attempt.

Returning again to block 404, in the event that the input event is not a scroll wheel rotation, the security module 300 checks to see the input event is input of an alphanumeric character through the keyboard 72 (block 414). If so, an assumption is made that the device user is attempting to enter a conventional alphanumeric password in a conventional manner, and a password entry interface screen is shown on display 22 (block 416). FIGS. 5 and 6 illustrate an example of such a screen, in which a dialog box 134 displaying the words "Enter Password:" appear, and below these words is a cursor or position marker 136, prompting the device user is prompted to enter a password in order to unlock the mobile device 10. As illustrated in FIG. 6, asterisks appear within the illustrated box 134 as the user uses his fingers and/or his thumb to generate a sequence of alphanumeric character input events processed by the security module 300. Once the user has completed entering the characters of his or her password, pressing a predetermined password submission key such pressing an enter key or depressing the scroll wheel, for example, causes the security module 300 to then compare the entered sequence of characters to a stored password (block 418) and either unlock the device (block 410) if the correct password was entered, or leave the device in a locked state (block 420) if the incorrect password was entered. Thus, blocks 414, 416, 418 represent a conventional alphanumeric password entry process. The password need not be strictly alphanumeric, and in example embodiments could for example, include only numeric characters, alphabetic characters, punctuation/special characters (e.g. !, @, #, $, %, ˆ, &, *, (,), <, >, /, ?), non-roman characters, or other characters that are capable of visual interpretation. In an example embodiment, once a user has entered the alphanumeric character password entry mode of block 416, subsequent use of the scroll wheel moves position marker 136 through the input filed in the dialog box 134, rather than providing a scroll wheel input sequence for use as a passcode sequence.

Turning again to blocks 404 and 414, in an example embodiment, in the event that the input event that occurred at block 402 was not a scroll wheel rotation or input of a character, the security module 300 recognizes that the user is not entering a valid password or scroll wheel sequence, and the device remains locked. In some embodiments, a "Device Locked Screen" may be displayed with options such as "Unlock" (which leads to a password prompt); "Emergency Call" (which permits the user to call a dedicated emergency number such as "911"); and "Cancel" may appear.

An overview having been provided, scroll wheel passcode sequence entry will now be discussed in greater detail according to example embodiments. As briefly discussed above with reference to blocks 404, 406 and 408 of FIG. 4, when a user scrolls the scroll wheel up or down, the security module tracks the sequence of scroll wheel rotational inputs for comparison against a predetermined "passcode sequence". By way of illustrative example, stored in memory (for example flash memory 24) of the device 10 is a predetermined scroll wheel passcode sequence of U-U-D-D-U-D-U-D where "U" represents scrolling of the scroll wheel in a first direction (e.g. an upward scroll of the scroll wheel 86) and "D" represents scrolling of the scroll wheel in a second, opposite, direction (e.g. a downward scroll of the scroll wheel 86). Thus, in the present example the scroll wheel password includes a sequence of seven distinct input events occurring through rotation or the scroll wheel 86. Each of the input events is selected from two possible options (U or D) and if the device user successfully performs those seven scroll wheel input events in the same sequence as in the stored passcode sequence and then presses the scroll wheel 86 (or other suitable submission key), the device 10 will be unlocked. Each scroll wheel input event will typically include only a partial rotation of the scroll wheel, and the actual rotational distance, which can depend for example on such factors as starting position of the user's digit (thumb or finger) on the scroll wheel, may vary. In an example embodiment, the security module 300 requires a certain minimum rotation of the scroll wheel to register a scroll wheel input event.

As indicated by the example scroll wheel passcode sequence U-U-D-D-U-D-U-D, the sequence can include two consecutive movements in the same direction (for example U-U or D-D). In an example embodiment, the security module 300 interprets rotational inputs in the same direction that are separated by a predetermined duration as two discrete input events. The time duration that signals a separation in input events may for example be the typical time that is associated with a device user repositioning his or her thumb or finger between rotations of the scroll wheel. In example embodiments, in block 406 the scroll wheel rotation input events are added to an input buffer 407 (stored for example on RAM 26) until the scroll wheel 86 is depressed (or another predetermined key such as an enter key is pressed), after which the contents of the buffer 407 are compared against the stored scroll wheel passcode sequence (block 408). In at least one example embodiment, in order to account for the possibility of unintentional scrolling of the wheel as a user picks up the device 10 or removes it from a holster or other storage location, only the last "N" input events stored in the buffer 407 prior to depression of scroll wheel are compared against the stored sequence in block 408, where "N" is the length of the stored scroll wheel passcode sequence.

Figure 7:
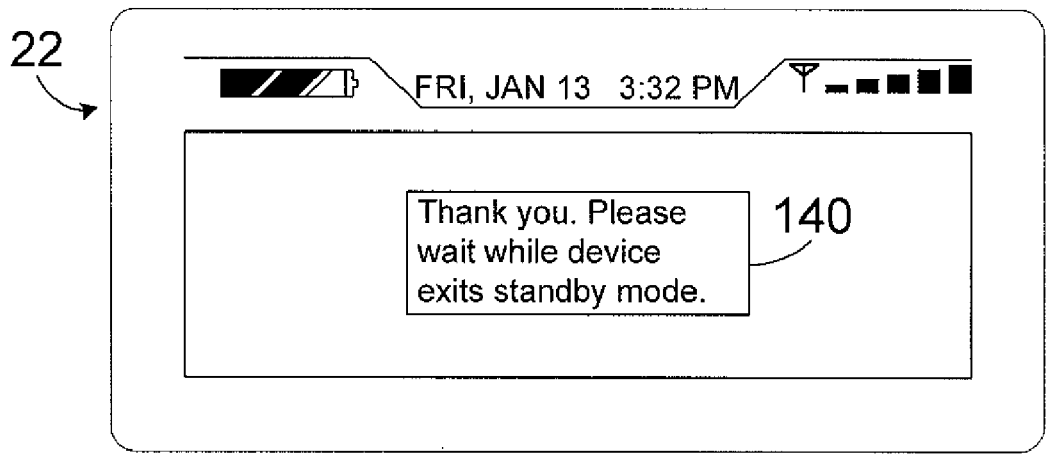
FIG. 7 shows, in diagrammatic form, a user interface screen similar to the screen shown in FIG. 5, except with a dialog box indicating that the password attempt was successful.

The scroll wheel 86 in example embodiments provides tactile feedback to the user as it is rotated. In some example embodiments, the security module 300 is configured to provide audible feedback for each input event through the scroll wheel that is added to buffer 407—for example, a beep or other sound can be generated through speaker 28 with each scroll of the scroll wheel to provide feedback that the device is treating the scrolling as input of a password. In some configurations, an audible sound could be generated when the scroll wheel is depressed to submit the sequence for comparison, and additionally or alternatively, audible sounds generated to either indicate a successful match and unlocking of the device or a failed entry (with different sounds being used for each). In some embodiments, visual feed back could be provided, either in combination with audible feedback or in the absence of audible feedback—for example, a password input screen such as shown in FIGS. 5 and 6 could be generated with an asterisk being displayed for each scroll wheel input event (and optionally, the displayed phrase "ENTER PASSWORD:" being replaced with "ENTER PASSCODE:" to identify to the device user the particular user authentication mode that is currently being applied). In some example embodiments, successful entry of a scroll wheel passcode sequence (or a normal alphanumeric password) can be provided through display screen interface confirming that the device is leaving standby mode, including for example message 140 as shown in FIG. 7.

In example embodiments, scroll wheel based user authentication does not require that the user look at the device 10 to observe its keyboard, but rather provides an authentication method that the user can carry out through feel alone without looking at the device. Thus, in addition to operating conventionally as a navigational input mechanism in one input mode (a navigation input mode), the scroll wheel 86 can also operate in a further input mode (a shared secret input mode) for unlocking the device 10. Typically, the scroll wheel will be operating (in conjunction with microprocessor 38) in a navigation input mode and user manipulation of the scroll wheel will result in movement of an on-screen marker in a user interface screen on display 22 and/or scrolling of displayed items on display 22. However, under certain predetermined conditions, the scroll wheel will operate (in conjunction with microprocessor 38) in a passcode sequence or shared secret input mode. These predetermined conditions under which user manipulations of the scroll wheel will be interpreted by the microprocessor as input of a shared secret include for example when the device 10 is waiting for entry of a shared secret (for example when the device is in a locked standby mode), and the user has not yet entered any characters. If under such conditions, the scroll wheel is rotated, then the inputs from the scroll wheel are processed in the shared secret input mode.

In some example embodiments audible feedback is provided to assist the device user in the "vision free" user authentication process. Scroll wheel based password entry as disclosed herein may also permit the device user to prevent others from discovering the user's password by watching which keys are depressed. This could be achieved, for example, by the device user putting both the mobile device 10 as well as his or her hand in a coat pocket, and then entering the scroll wheel passcode sequence with both his or her hand and the mobile device 10 concealed by the coat pocket.

In at least some example embodiments, the device user has the option to enable and disable the use of scroll-wheel based passcode sequence entry through set up and configuration screens presented on the mobile device 10, or through a personal computer that is commonly associated with the mobile device 10 and the user of the device 10 (for example, a personal computer that is configured with a docking station for synchronizing with the mobile device 10). Alternatively, the availability of scroll-wheel based passcode sequence entry could be enabled and disabled in example embodiments through IT policy messages received at the device 10 through communications subsystem 11 from an authorized and trusted source.

Figure 8:
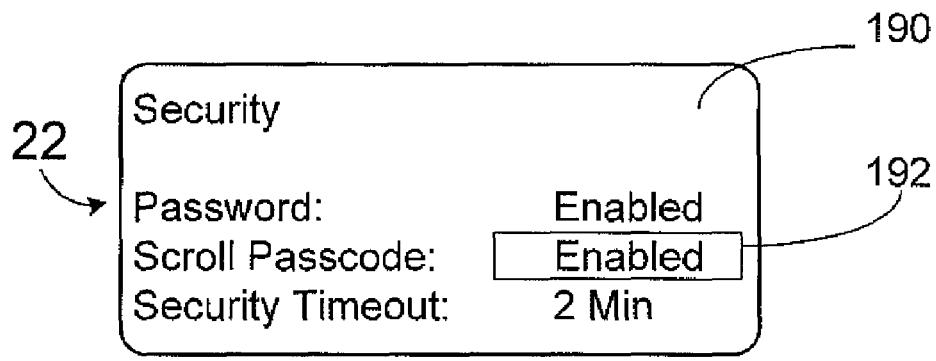
FIG. 8 shows, in diagrammatic from, an example embodiment of a user interface screen for setting security features of the mobile device.
Figure 9:
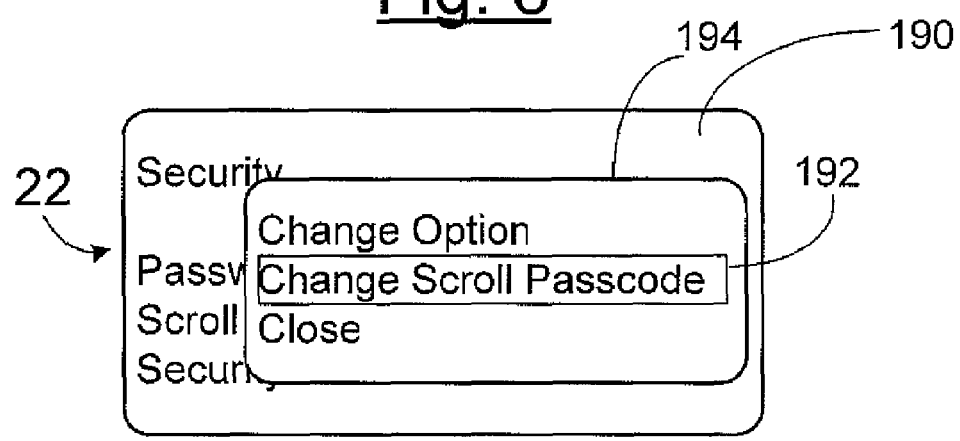
FIG. 9 shows, in diagrammatic from, an example embodiment of a the user interface screen of FIG. 7 with a dialog box presenting a change scroll password option.
Figure 10:
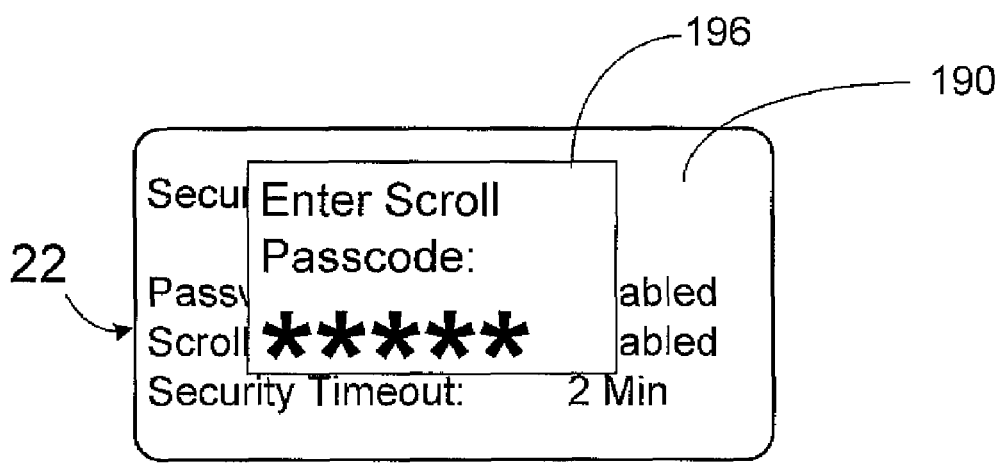
FIG. 10 shows, in diagrammatic from, an example embodiment of a the user interface screen of FIG. 7 with a dialog box presenting a scroll password change box.

With reference to FIGS. 8 to 10, example user interface screens and methods for enabling and changing the scroll-wheel password entry sequence will now be discussed. Such screens may in an example embodiment be enabled by operating system software 50 running on processor 38. In an example embodiment, such screens and methods are enabled by security module 300. When the mobile device 10 is unlocked, the user can access a security interface screen 190 that permits the user to change selected security options for the mobile device 10, including for example, an option to enable/disable or change the standard alphanumeric password, an option to enable/disable or change the scroll passcode sequence, and an option to change the security timeout period (the time after which the device 10 locks in the absence of user activity). In the example shown in FIG. 8, a device user has caused a movable selection marker 192 to highlight the selectable word "Enabled" adjacent the "Scroll Passcode" option. The user can move the selection marker 192 through the list of selectable items in screen 190 by rotating the scroll wheel 86 up or down, resulting in corresponding movement of the selection marker 192. Depression of the scroll wheel 86 while an item is highlighted or focused by the selection marker 192 results in a user selection input for the highlighted item. User selection of the word "Enabled" results in a dialog box 194 shown in FIG. 10 being generated on screen 22. The dialog box 194 presents the device user with selectable options in respect of the scroll passcode sequence including "Change Option" (which allows the user to enable or disable scroll wheel password input); "Change Scroll Passcode" (which allows the user to change the scroll wheel passcode sequence) and "Close", which closes the window 194. A selection marker 192 can be scrolled through the options listed in window 194 to facilitate user selection of one of the options. Selection of the "Change Option" option brings the user to a further screen in which they can 'enable' and "disable" scroll wheel password entry. Selection of the "Change Scroll Passcode" option in window 194 results in an "Enter Scroll Passcode" window 196 as shown in FIG. 10 being displayed.

When the window 196 is displayed, the user can register a sequence of scroll wheel rotation input events to use as a future scroll wheel passcode sequence (for example, the U-U-D-D-U-D-U-D sequence noted above could be entered). In an example embodiment an asterisk or other visual indicator is displayed in window 196, and/or an audible sound is generated, to provide feedback to the user of the discrete scroll wheel rotation input events the user is inputting. User depression of the scroll wheel (or other predetermined submission key) signals that the entire desired scroll wheel passcode sequence has been entered. In one example embodiment, the new scroll wheel passcode sequence is then stored on the device 10 (perhaps in memory 24) to be used a shared secret for future user authentication through the process of FIG. 4. In some embodiments, double entry of the new sequence is required before the sequence is accepted and stored as the new scroll wheel passcode sequence for the device. In some embodiments, encryption is applied to the scroll wheel passcode sequence that is stored on the device 10. In some example embodiments, a minimum and/or maximum number of scroll wheel input events are required for a valid scroll wheel passcode sequence and proposed sequences that do not meet such requirements are rejected as scroll wheel passcode sequences.

In an example embodiment, because the alphanumeric password can alternatively be used to authenticate the device user and thus access security interface screen 190, the user can easily reset the scroll wheel passcode sequence in the event that they forget it. Similarly in an example embodiment, because the scroll wheel passcode sequence can be used to authenticate the device user and thus access security interface screen 190, the user can easily reset the alphanumeric password for the device 10 in the event that they forget it.

Referring again to the method of FIG. 4, in the example embodiments described above comparison block 408 occurs after the device user depresses the scroll wheel 86 (or in some configurations, presses some other predetermined submission key). In some example embodiments, the security module 300 is configured to not consider depression of the scroll wheel 86 as signaling submission of the of the scroll wheel passcode sequence, but rather to instead treat the depression as another scroll wheel input event in the sequence—so for example, the sequence could include U-U-D-SD-U-SD-D, where SD=scroll wheel depression. In such a configuration, a further button or key on the device 10 could be assigned as a submission key for causing a tracked sequence of scroll wheel input events from block 406 to be submitted for comparison with the predetermined passcode sequence in block 408.

In some example embodiments, depression of a submission key after completing a sequence of scroll wheel inputs is not required to advance to comparison block 408—for example, in alternative configurations the security module 300 may automatically perform the comparison after the number of input events recorded in buffer 407 reaches the same number N as events in the stored scroll wheel passcode sequence. In a further alternative configuration, a comparison is done for each scroll wheel input event as it occurs, such that an incorrect entry is detected at the first instance of deviation from the stored scroll wheel passcode sequence.

In the scroll-wheel rotation input events described above, two separate rotational input events ("U" or "D") are possible, and three different scroll wheel password input events are possible in embodiments where scroll wheel depression is included as an scroll wheel password input event rather than as a password submission event. In alternative embodiments, further differentiation is possible by including factors other than just rotational direction into the scroll wheel passcode sequence. For example, timing relating to an input event could be used to further distinguish between possible scroll wheel inputs. For example, the duration of a rotational event can be used to differentiate between a "fast" rotation event and a "slow" rotation event, allowing a "fast upward rotation" (FU) to be distinguished from a "slow upward rotation" (SU) and a "fast downward rotation" (FD) to be distinguished from a "slow downward rotation" (SD). So for example, a scroll wheel passcode sequence using rotational speed resolution could include four different possible rotational input events (FU-SU-FD-SD). As can be appreciated, greater possible variation in possible input events can enhance security.

Figure 11:
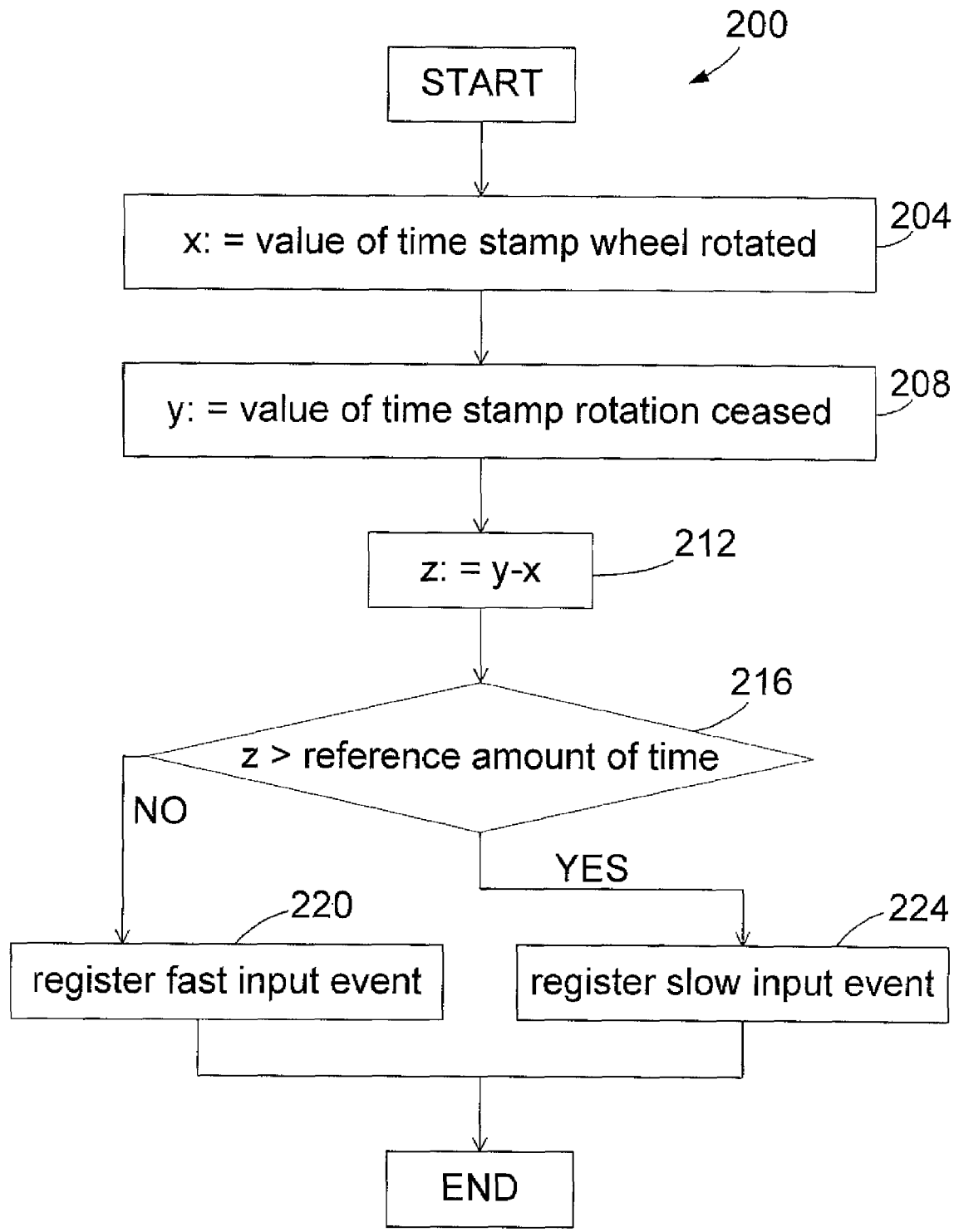
FIG. 11 shows, in flow chart form, an example method for evaluating duration of an input event.

FIG. 11 shows an example of a possible method 200 for discerning the speed of a rotational input event. The security module 200 records a start time stamp (step 204) and an end time stamp (strep 208) for a rotational input event (the event being either an upward rotation or a downward rotation). For example, the mobile device 10 records a time at which a device user starts to rotate the scroll wheel 86 and the time at which the device user ceased rotating the scroll wheel 86. The difference between the start and stop times for the rotational input event is then calculated (step 212), providing a duration of the rotational input event. The duration of the input event is representative of the rotational speed. At a decision step 216, the duration of the input event which was obtained in the step 212 is compared against a reference amount of time. If the duration of the input event is not greater than the reference amount of time, then the next step is step 220 where the input event is registered as being a fast input event. Conversely, if the duration of the input event is greater than the reference amount of time, then the next step is step 224 and the input event is registered as being a slow input event. An even greater representation of rotational speed can be obtained, if desired, by measuring the rotational distance accomplished during the rotational input event and diving that by the measured duration.

In example embodiments, the rotational distance may also be used to distinguish between different rotational input events if desired. For example, a rotation that exceeds a threshold number of degrees of rotation may be a "long up" or long down" input event, with a rotation below that threshold being a "short up" or "sort down" input event, for example. Thus, for example, a scroll wheel password could consist of "long up-short up-long down-short down"

In an example embodiment, the security module 300 is configured to perform a device wipe and erase all user data stored on flash memory 24 and/or RAM 26 if the user enters the incorrect password more than a threshold number of times without entering the correct password. In one example embodiment, a different wipe threshold is applied in the case of alphanumeric character password input than for scroll-wheel passcode sequence input. For example, in one illustrative embodiment, ten failed attempts to enter an alphanumeric character password without an intervening successful user authentication results in a device wipe, whereas five failed attempts to correctly enter a scroll-wheel passcode sequence without an intervening successful user authentication results in a device wipe. Applying a lower threshold in the case of scroll-wheel passcode sequence input can in some embodiments be used to off-set any perceived higher risk of using a password made up of fewer possible input options.

Shared secret entry methods disclosed herein can be applied to other system implemented protection mechanisms besides those involving unlocking of a mobile device. For example, password entry is sometimes required in order to access e-mails or other kinds of message-related items. In example embodiments, a scroll wheel passcode sequence as described above is used to provide user authentication to access protected emails and other messages and documents. In some embodiments, a scroll wheel passcode sequence may be used to access a message rendering application, or alternatively to open individual protected messages.

It will be understood that user authentication methods and systems in accordance with example embodiments can rely upon other navigational input mechanisms besides scroll wheels. For example, in addition to or instead of a scroll wheel, a mobile device may be provide with a navigational input mechanism in the form of a directional key or button 78 for on-screen navigation (i.e. for moving a cursor or similar selection indicia within any user interface generated on the display 22). With respect to the illustrated directional button 78, in one mode of operation, "up" directional navigation (to move an onscreen cursor or position marker for example, and/or scroll though displayed items) is achieved by depressing top end 79 of the directional button 78, "down" directional navigation is achieved by depressing bottom end 80 of the directional button 78, "right" directional navigation is achieved by depressing right end 81 of the directional button 78, and "left" directional navigation is achieved by depressing left end 82 of the directional button 78. A selection or submission entry can be made by depressing the center of the button 78. Thus, a directional navigation key such us button 78 could be used, for example, in a further mode to input the sequence "U-D-L-R" where U=up; D=down; L=left; and R=right as a passcode sequence. In some alternative embodiments, the navigational input mechanism can take a different form than directional button 78, for example, a small joystick or a touch pad or a touch screen. If the mobile device includes a joystick, then it could be moved up, down, etc. to generate a sequence of input events in a manner similar to generation by scroll wheel 86 or directional button 79. As another example, if the mobile device includes a touch screen or touch pad, then hand digits could be moved across the screen or pad to generate a sequence of input events in a manner similar to generation by a joystick or a directional button. In some embodiments, a track ball that can be rotated in several directions could be used in place of a scroll wheel.

Certain adaptations and modifications of the described embodiments can be made. Therefore, the above discussed embodiments are considered to be illustrative and not restrictive.

What is claimed is:

1. An electronic mobile device, comprising:
   a controller;
   a display coupled to the controller; and
   a touch pad coupled to the controller;
   the controller, in one input mode, moving a selection marker on a user interface screen on the display in response to input from the touch pad, and in a second input mode, performing authentication using a sequence of input events from the touch pad matching a predetermined passcode sequence corresponding to one or more directions of successive inputs detected by the touch pad, and in the second input mode being operative to interpret each distinct directional input as an input event corresponding to a fast input or a slow input in the predetermined passcode sequence corresponding to a predetermined sequence of input events corresponding to the fast input or the slow input.

2. The electronic mobile device of claim 1, wherein in the second input mode the controller is operative to detect distinct directional inputs in a first direction and a second direction opposite to the first direction and to interpret each distinct directional input detected by the touch pad as either an input event corresponding to the first direction or the second direction, and wherein the predetermined passcode sequence corresponds to a predetermined sequence of input events corresponding to the first direction or second direction.

3. The electronic mobile device of claim 2, wherein in the second input mode the controller is operative to detect distinct directional inputs in a third direction and fourth direction opposite to the third direction and to interpret each distinct directional input detected by the touch pad as either an input event corresponding to the first, second, third or fourth direction, and wherein the predetermined passcode sequence corresponds to a predetermined sequence of input events corresponding to the first, second, third or fourth directions.

4. The electronic mobile device of claim 3, wherein in the first direction and the second direction correspond to up and down directional inputs relative to the touch pad, and the third direction and the fourth direction correspond to left and right directional relative to the touch pad.

5. The electronic mobile device of claim 2, wherein in the second input mode the controller is operative to interpret each distinct directional input as an input event corresponding to fast input in the first direction, slow input of the in the first direction, fast input in the second direction, or slow input of in the second direction, and wherein the predetermined passcode sequence corresponds to a predetermined sequence of input events corresponding to fast input in the first direction, slow input in the first direction, fast input in the second direction, or slow input in the second direction.

6. The electronic mobile device of claim 2, wherein in the second input mode the controller is operative to interpret each distinct directional input as an input event corresponding to long input in the first direction, short input of the in the first direction, long input in the second direction, or short input of in the second direction, and wherein the predetermined passcode sequence corresponds to a predetermined sequence of input events corresponding to long input in the first direction, short input in the first direction, long input in the second direction, or short input in the second direction.

7. The electronic mobile device of claim 1 wherein the touch pad is depressible, and the predetermined passcode sequence may comprise an input event corresponding to a depression of the touch pad.

8. The electronic mobile device of claim 1, wherein in the touch pad is depressible, and the second input mode the controller is operative to compare the sequence of input events to the predetermined passcode sequence upon depression of the touch pad.

9. The electronic mobile device of claim 1, wherein the mobile device has a locked standby state in which access to functionality of the device is substantially limited, and an unlocked state in which access to functionality of the device is permitted, the controller being operative to unlock the device upon completion of authentication using input at the device.

10. The mobile device of claim 1, wherein the device comprises a physical user interface coupled to the controller for receiving input of characters to the controller, the controller being operative to also perform authentication in dependence on a sequence of characters detected at the physical user interface matching a predetermined password.

11. The mobile device of claim 10, wherein the device comprises a storage coupled to the microprocessor and having data stored thereon, and wherein the controller is operative to (i) automatically wipe at least some of the data from the storage upon occurrence of a first predetermined number of failed authentications made using the touch pad; and (ii) automatically wipe at least some of the data from the storage upon occurrence of a second predetermined number of failed authentications made using the physical user interface, the second predetermined number being greater than the first predetermined number.

12. A method of authentication of an electronic mobile device having a touch pad that can receive input to facilitate on-screen navigation for the electronic mobile device, the method comprising:
   receiving a sequence of inputs through the touch pad, the sequence comprising one or more directions of successive inputs;
   interpreting each distinct directional input detected at the touch pad as either an input event corresponding to a first direction or a second direction and as either a fast input or a slow input;
   comparing the received sequence of inputs to a predetermined passcode sequence, wherein the predetermined passcode sequence corresponds to a predetermined sequence of the input events corresponding to the first direction or second direction and the fast input or the slow input; and
   authenticating if the received sequence of inputs matches the predetermined passcode sequence.

13. The method of claim 12, comprising unlocking the mobile device upon authenticating.

14. The method of claim 12, comprising an alternative method of authentication, the alternative method comprising:

receiving a sequence of character inputs through character input keys of the device;

comparing the received sequence of character inputs to a predetermined password; and authenticating if the received sequence of character inputs matches the predetermined password.

15. The method of claim 12, comprising differentiating between long inputs and short inputs when comparing the received sequence of inputs to the predetermined passcode sequence.

16. The method of claim 12, comprising differentiating between fast inputs and slow inputs when comparing the received sequence of inputs to the predetermined passcode sequence.

17. A non-transitory computer program product comprising a computer readable medium having stored thereon computer executable instructions for authentication of an electronic mobile device having a touch pad that can receive input to facilitate on-screen navigation for the electronic mobile device, the computer executable instructions comprising:

receiving a sequence of inputs through the touch pad, the sequence comprising one or more directions of successive inputs;

interpreting each distinct directional input detected at the touch pad as either an input event corresponding to a first direction or a second direction and a fast input or a slow input;

comparing the received sequence of inputs to a predetermined passcode sequence, the predetermined passcode sequence corresponding to a predetermined sequence of the input events corresponding to the first direction or second direction and the fast input or the slow input; and authenticating if the received sequence of inputs matches the predetermined passcode sequence.

18. The non-transitory computer program product of claim 17, the computer executable instructions comprising unlocking the mobile device upon authenticating.

19. The non-transitory computer program product of claim 17, the computer executable instructions comprising an alternative method of authentication, the alternative method comprising:

receiving a sequence of character inputs through character input keys of the device;

comparing the received sequence of character inputs to a predetermined password; and authenticating if the received sequence of character inputs matches the predetermined password.

20. The non-transitory computer program product of claim 17, the computer executable instructions comprising differentiating between long inputs and short inputs when comparing the received sequence of inputs to the predetermined passcode sequence.

* * * * *

UNITED STATES PATENT AND TRADEMARK OFFICE
CERTIFICATE OF CORRECTION

PATENT NO. : 8,311,530 B2
APPLICATION NO. : 11/627400
DATED : November 13, 2012
INVENTOR(S) : Alexander Kornilovsky et al.

Page 1 of 1

It is certified that error appears in the above-identified patent and that said Letters Patent is hereby corrected as shown below:

In the Specification:

At column 1, line 36, "mobile device" should read --mobile device;--.
At column 1, line 47, "diagrammatic from" should read --diagrammatic form--.
At column 1, line 50, "diagrammatic from" should read --diagrammatic form--.
At column 1, line 51, "a the user" should read --a user--.
At column 1, line 53, "diagrammatic from" should read --diagrammatic form--.
At column 1, line 54, "a the user" should read --a user--.
At column 4, line 48, "is able provide" should read --is able to provide--.
At column 5, lines 38-39, "prompting the device user is prompted" should read --prompting the device user--.
At column 9, line 12, "of the of the scroll" should read --of the scroll--.
At column 9, line 36, "as an scroll" should read --as a scroll--.
At column 10, line 13, "long down"" should read --"long down"--.
At column 10, line 49, "may be provide with" should read --may be provided with--.
At column 10, line 64, "such us button" should read --such as button--.

In the Claims:

In column 11, claim 5, line 61, "input of the in the first" should read --input in the first--.
In column 11, claim 5, line 62, "input of in" should read --input in--.
In column 12, claim 6, line 4, "input of the in the first" should read --input in the first--.
In column 12, claim 6, lines 5-6, "input of the in the second" should read --input in the second--.

Signed and Sealed this
Eighteenth Day of March, 2014

Michelle K. Lee
*Deputy Director of the United States Patent and Trademark Office*